(12) United States Patent
Chang et al.

(10) Patent No.: US 8,009,147 B2
(45) Date of Patent: Aug. 30, 2011

(54) MULTI-TOUCH INTERFACES FOR USER AUTHENTICATION, PARTITIONING, AND EXTERNAL DEVICE CONTROL

(75) Inventors: E. Lee Chang, Mableton, GA (US); Madhur Khandelwal, Atlanta, GA (US); Linda Roberts, Decatur, GA (US); Sharon Carter, Austell, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1006 days.

(21) Appl. No.: 11/862,489

(22) Filed: Sep. 27, 2007

(65) Prior Publication Data

US 2009/0085877 A1    Apr. 2, 2009

(51) Int. Cl.
    *G06F 3/041*    (2006.01)
(52) U.S. Cl. .......................... 345/173; 345/169
(58) Field of Classification Search .......... 345/156–173; 178/18.01–18.04
    See application file for complete search history.

(56) References Cited

U.S. PATENT DOCUMENTS

| 6,476,797 | B1 * | 11/2002 | Kurihara et al. ............... 345/173 |
| 2003/0034185 | A1 * | 2/2003 | Kaikuranta ................ 178/18.01 |
| 2007/0070050 | A1 | 3/2007 | Westerman et al. |
| 2009/0083850 | A1 * | 3/2009 | Fadell et al. ..................... 726/19 |
| 2009/0109180 | A1 * | 4/2009 | Do et al. ....................... 345/173 |
| 2010/0149134 | A1 * | 6/2010 | Westerman et al. .......... 345/179 |
| 2010/0282524 | A1 * | 11/2010 | Linotte et al. .............. 178/18.01 |

OTHER PUBLICATIONS

Multi-Touch Systems that I Have Known and Loved, http://www.billbuxton.com/multitouchOverview.html, Bill Buxton, Jul. 17, 2007.
Microsoft Surface, http://www.microsoft.com/surface, 2007.
Perceptive Pixel, http://www.perceptivepixel.com, 2007.

* cited by examiner

*Primary Examiner* — Nitin Patel
(74) *Attorney, Agent, or Firm* — Parks IP Law LLC; Jennifer P. Medlin, Esq.

(57) ABSTRACT

Multi-touch interfaces allow user interaction with multiple points of contact to control external devices such as game consoles, authenticate users, partition the interface for multiple users, and so forth. The multi-touch interface may provide graphical representations that are manipulated by users through multiple points of contact to participate in games running on an external game console. Additionally, user authentication may occur through multiple points of contact with the multi-touch interface where each user has a unique contact pattern that includes points of contact, location of points of contact, rhythm of points of contact, and so forth. The graphical representations may be customized based on the authentication of a user, and the multi-touch surface may be partitioned based on the number of users present.

20 Claims, 7 Drawing Sheets

MULTI-TOUCH INTERFACES FOR USER AUTHENTICATION, PARTITIONING, AND EXTERNAL DEVICE CONTROL

TECHNICAL FIELD

Embodiments provide multi-touch interfaces that allow users to interact via multiple points of physical contact. More particularly, the embodiments provide multi-touch interfaces that allow for external device control and/or authentication of users via the multiple points of contact.

BACKGROUND

Touchscreens are useful interfaces for users as they allow the user to interact with visual displays of items such as icons, buttons, documents, and so forth. Recently, touchscreens have evolved to provide multi-touch interfaces that allow users to interact via multiple points of contact. This allows users to perform complex manipulations such as grasping, stretching, and the like of objects being displayed.

While multi-touch interfaces allow for such complex manipulation, the uses of the multi-touch interface remain limited largely to interaction with typical desktop objects such as icons, buttons, and documents such as web pages. More recent developments also allow for recognition of objects placed onto the multi-touch interface. However, users may desire additional involvement with the multi-touch interface in other contexts than those currently provided.

SUMMARY

Embodiments provide for user authentication, partitioning, and/or external device control through interaction with multi-touch interfaces. For example, users of the multi-touch interface may be authenticated for various purposes, such as to customize the device controls and/or partition the multi-touch space, by allowing for physical contact pattern matching via the multi-touch interface. The multi-touch interface may provide for external device control, such as providing controls for a gaming console, by receiving multi-touch input. Additionally, the multi-touch interface may be partitioned to provide physical areas that are distinguishable such as to provide each user with a defined interface area.

Embodiments provide a computer readable medium containing instructions for performing acts in conjunction with a multi-touch interface. The acts include receiving input signals in response to multiple points of simultaneous physical contact on the multi-touch interface and comparing the input signals to data that is stored in a memory and that represents a pattern of physical contact associated with a user. The acts further include determining from the comparison whether the physical contact represented by the input signals matches the pattern of physical contact associated with the user. Additionally, a signal value is produced that indicates a successful authentication of the user and that identifies the user upon determining that the physical contact matches the pattern of physical contact associated with the user.

Embodiments provide a device for generating external control signals that includes a multi-touch interface that produces input signals in response to multiple points of simultaneous physical contact. The device further includes a processing device that is in data communication with the multi-touch interface and that analyzes the input signals to produce instructions to manipulate an aspect of an electronic game. The device also includes an output interface for sending game control signals to a gaming console, and the output interface receives the instructions from the processing device and generates the game control signals based on the instructions.

Embodiments provide a method of providing defined areas of interaction with a multi-touch display. The method involves defining physical areas of the multi-touch display as logically separate areas without regard to content being displayed on the multi-touch display. The method further involves receiving multiple points of simultaneous physical contact on the multi-touch display and determining which of the multiple points of simultaneous physical contact occur within each of the logically separate areas. Additionally, the method involves producing at least one signal based on which of the multiple points of contact occur within each of the logically separate areas.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Embodiments provide for various manners of additional interaction with multi-touch interfaces. Embodiments may provide for authentication of users by recognition of multi-touch interaction such as the number and location of the points of contact. Embodiments may provide for external device control, such as the control of a game console, through multi-touch interaction. Furthermore, embodiments may provide for partitioning of the multi-touch interface such as to provide for different workspaces to perform different tasks and/or to separate interactions of one user from those of another.

Figure 1:
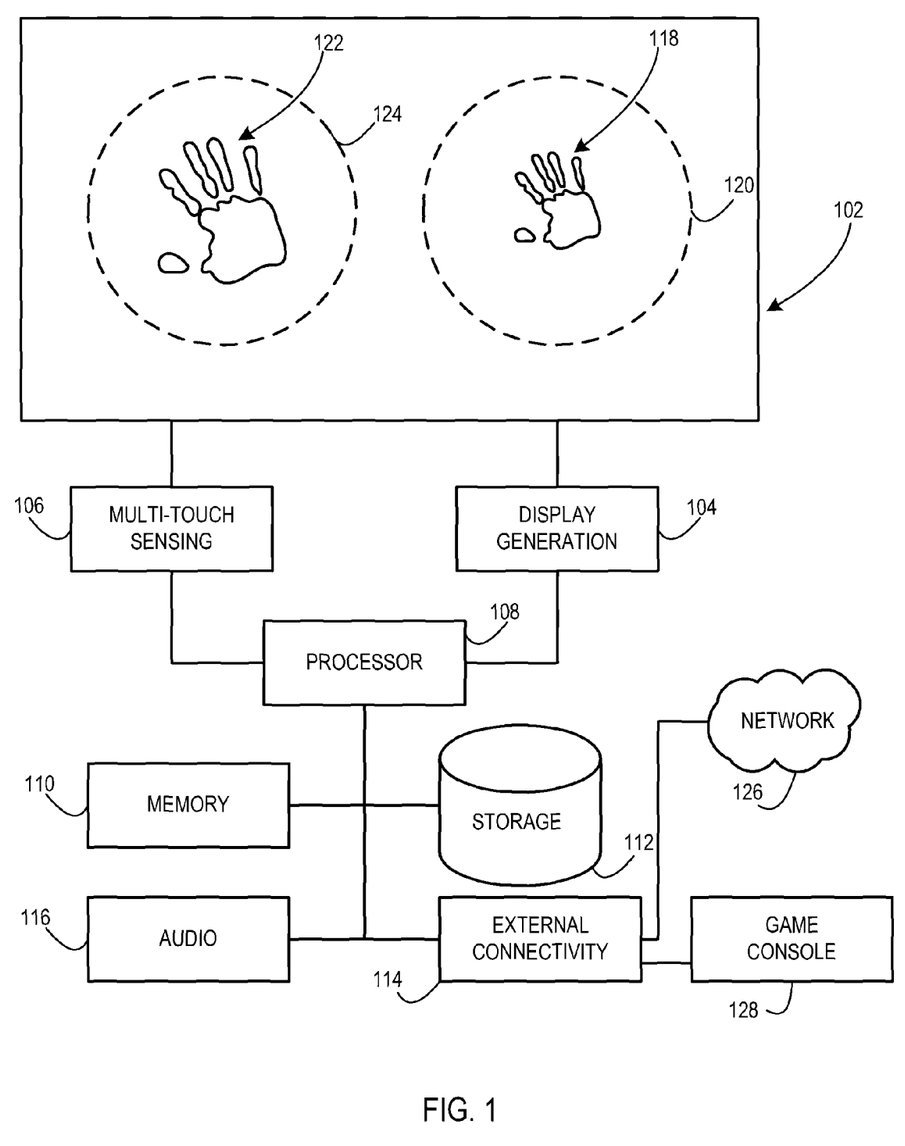
FIG. 1 shows one example of a multi-touch interface.

FIG. 1 shows an example of a multi-touch interface system. The multi-touch interface system includes a multi-touch interface 102 which is receptive of multiple simultaneous points of physical contact by users while also providing a visual display. In this example shown, two users have simultaneously placed their palms onto the screen to produce two different handprints 118, 122 on the multi-touch interface 102, with many points of contact present within each handprint 118, 122.

As discussed in more detail below, the users in this example have interacted with the multi-touch interface 102 in such a way as to provide a recognizable pattern of physical contact. As a result, in this particular embodiment, the multi-touch interface 102 has defined a partition for each user, with the user for the handprint 118 having a first partition 120 and the user for the handprint 122 having a second partition 124. The partitions 120, 124 may be used for various purposes customized for or otherwise dedicated to uses specific to each user.

The multi-touch interface 102 may produce a visual display by including liquid crystal display (LCD) technology, light emitting diode (LED) technology), or plasma technology, as well as various other display technologies well known in the art. The multi-touch interface 102 may generate such displays by being driven from an interconnected display generation module 104, such as a one of the many variants of a video graphics array (VGA) adapter.

The multi-touch interface 102 may receive and register the physical contact of the users, including multiple simultaneous points of physical contact, by including sensory technology such as capacitive pressure detection or optical recognition as well as various other technologies for physical contact detection that are well known in the art. The multi-touch interface 102 may generate signals representative of such physical contact detection through a multi-touch sensing module 106 that includes well known circuitry for converting the capacitive pressure detection, optical recognition, or other raw signal into data signals that can be processed.

Additionally, other forms of physiological sensing may occur to supplement the detection of the physical contact. For example, the temperature of the user at the points of contact may be detected via temperature sensing techniques such as using thermocouples and the like. Perspiration or other chemical detection at the points of contact may be detected through sensors that are responsive to chemical reaction. Furthermore, non-contact related physiological sensing may be used to further supplement the sensing of the physical contact. For example, voice recognition may be performed, either by voice detection components of the sensing module 106 or by voice detection components of the corresponding computer system. Thus, temperature patterns, perspiration or other chemical qualities, voice commands, and/or voice prints may be used in conjunction with the embodiments below.

The multi-touch interface 102 is interconnected to equipment that may form an integrated or separate computer system. The display generation module 104 and multi-touch sensing module 106 may be integrated into the multi-touch interface 102, into an integrated computer system, or integrated into a separate computer system. In any of these configurations, a processor 108 is present to provide display instructions to the display generation module 104 and to receive data representative of the physical contact with the multi-touch interface 102 as input signals from the multi-touch sensing module 106.

The processor 108 of this example also communicates over a data bus with a memory 110, a storage device 112, an audio generation module 116, and with external connectivity ports 114. The memory 110 may store information that the processor 108 is using when generating displays, when receiving input signals representative of the physical contact, and when performing other typical computer system tasks. The memory 110 may also store instructions to be performed by the processor 108 when performing such tasks. The storage device 112 may also store such information, such as for long term, non-volatile storage. Furthermore, the storage device 112 may store additional long term data, such as user profile information which may include data that the processor 108 implements to provide customization or other user specific features such as when authenticating, partitioning, and providing external device control.

The processor 108 may be of various types such as a general purpose programmable processor, an application specific processor, hard-wired digital logic, and various combinations thereof. The processor 108, the memory 110, and the storage device 112 are examples of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The processor 108 may communicate with external devices through the external connectivity ports 114. For example, a network interface port may be provided to allow for communication with a network 126, such as a local area network, wide area networks, the Internet, and so forth. Examples include Ethernet ports, Wi-Fi ports, and so on. Furthermore, these external ports 114 may be used to communicate with external devices. For example, an infrared or radio frequency emitter may be included to communicate remote control signals to electronic equipment such as televisions, digital versatile disc players, and so forth. As another example, a game console output connector may be provided to send game console controller signals to an external game console 128 such as a PLAYSTATION® console, XBOX® console, and the like.

Users may interact with displayed graphics on the multi-touch interface 102 in order to establish communications with external devices. For example, a remote control graphic may be provided to allow functions to be selected by a user and remote control signals corresponding to the selected function may then be transmitted. Likewise, a game controller graphic, such as those discussed below in relation to FIGS. 3 and 4 may be displayed to allow game control inputs to be selected by a user and game console signals corresponding to the selected game control inputs may then be transmitted to the game console 128.

Figure 2:
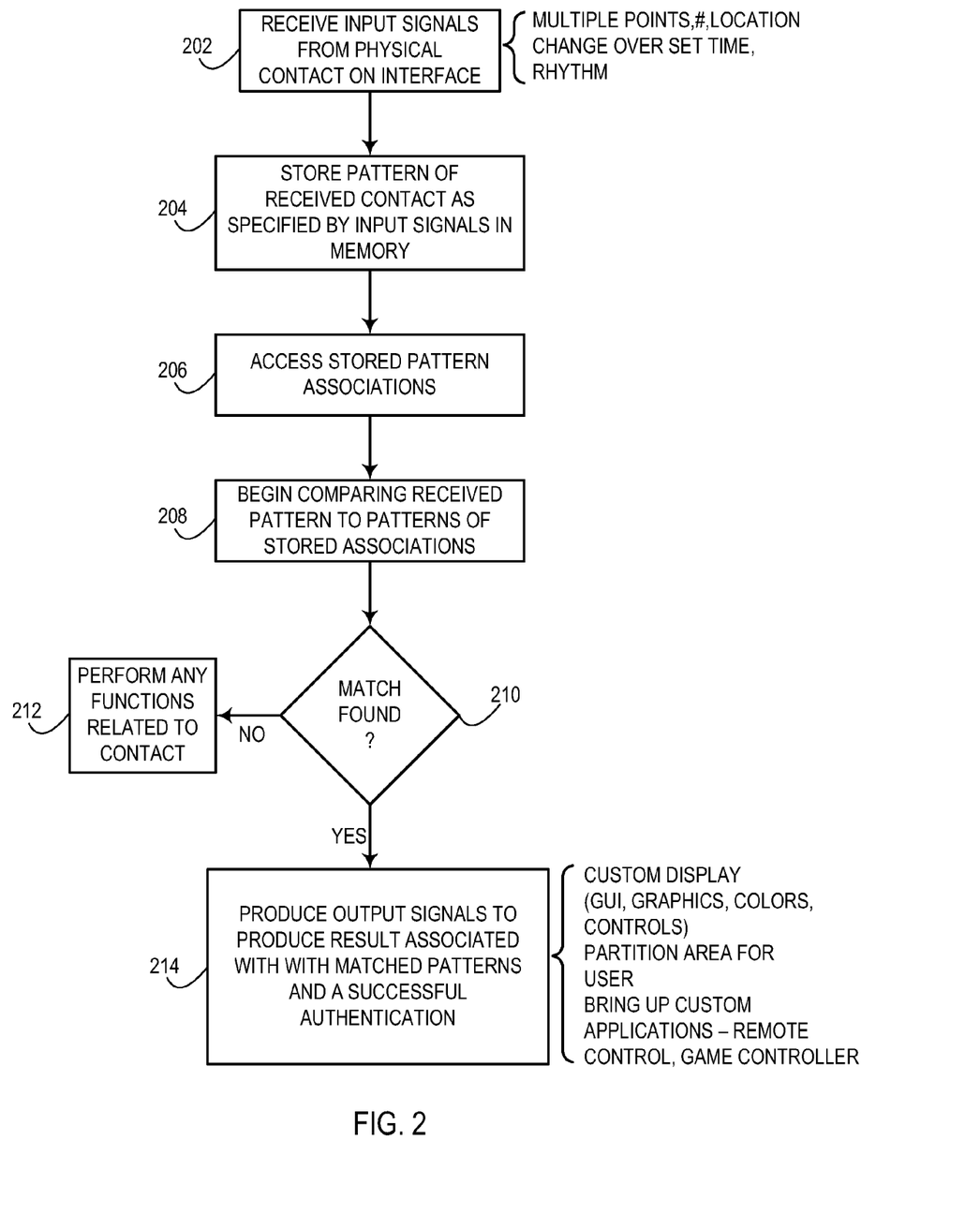
FIG. 2 shows one example of a set of logical operations being performed by a multi-touch interface to authenticate users.

FIG. 2 shows one example of a set of logical operations being performed by the processor 108 to authenticate users. Authentication of users of the multi-touch interface 102 may allow for many additional features. For example, a user may be authenticated in order to establish a partition on the multi-touch interface 102 that is dedicated to applications, external devices, functions, and features specific to the user or to dedicate the entire multi-touch interface to such user-specific things. Furthermore, authentication may result in customization of the display or partition for the user, customization of icons, controls, and so forth. For example, the user may prefer a particular configuration of game controller buttons and the multi-touch interface 102 may display the game controller with the particular configuration on the display, and within the authenticated user's partition for embodiments where partitioning is being provided.

The logical operations begin at an input operation 202 where the processor 108 receives the input signals that include data that is representative of the physical contact on the multi-touch interface 102. The input signals may represent that there are multiple points of contact with the number of points of contact and the location of the points of contact being defined within the input signals. Furthermore, the processor 108 may receive a series of signals over time and may look for a change in the number and location of the points of contact, such as to see a pattern in the physical contact including rhythms, pace of changes in specific finger and hand configurations, size of finger spacing, size of handprints, pressure of each of the points of physical contact, and so forth. Additionally, according to some embodiments, the processor 108 may also receive input signals for the supplemental physiological sensing that is occurring, if any, such as the temperature, perspiration, and voice sensing that is discussed above.

The processor 108 stores the received pattern of physical contact that is specified by the data of the input signals in the memory 110 at a storage operation 204. According to some embodiments, the processor 108 may also store the corresponding supplemental physiological data.

The processor 108 then accesses from the storage 112 the patterns associated with each of the users subject to authentication at an access operation 206. According to exemplary embodiments, users wishing to be authenticated have previously entered the authentication pattern of their choice via the multi-touch interface 102 during a setup routine so that the processor 108 has stored their authentication pattern in advance and accesses the patterns at this point to attempt an authentication of the present user.

The processor 108 compares the received pattern to the patterns that have been previously stored at a comparison operation 208. Here, the processor 108 is looking for matches of the various criteria of the pattern such as the number of points of contact, the location of the points of contact relative to the bounds of the multi-touch interface 102 and/or relative to each of the other points of contact, the change to the points of contact over a time period, and so on. For some embodiments, the processor 108 may also look for matches of the supplemental physiological data for further discrimination and/or accuracy to the pattern matching.

At a query operation 210, the processor 108 detects whether a match has been found between the received pattern and the stored patterns. If no match has been found, then the processor 108 proceeds in performing any functions related to the contact, such as selection of a displayed object or menu item, resizing or movement of objects, and so forth at function operation 212. If a match is found, then the processor 108 then produces output signals needed to produce the results that are associated with the matched pattern and to acknowledge that a successful authentication has occurred at output operation 214.

For example, the processor 108 may produce signals to cause the display adapter to display a custom user interface for the user and/or to display custom graphics such as background images, colors, and controls. The processor 108 may produce signals to partition an area around the location of the physical contact to designate it as a workspace of the authenticated user. The processor 108 may activate custom applications of the authenticated user such as displayed remote controls, game controllers, and so forth.

Figure 3:
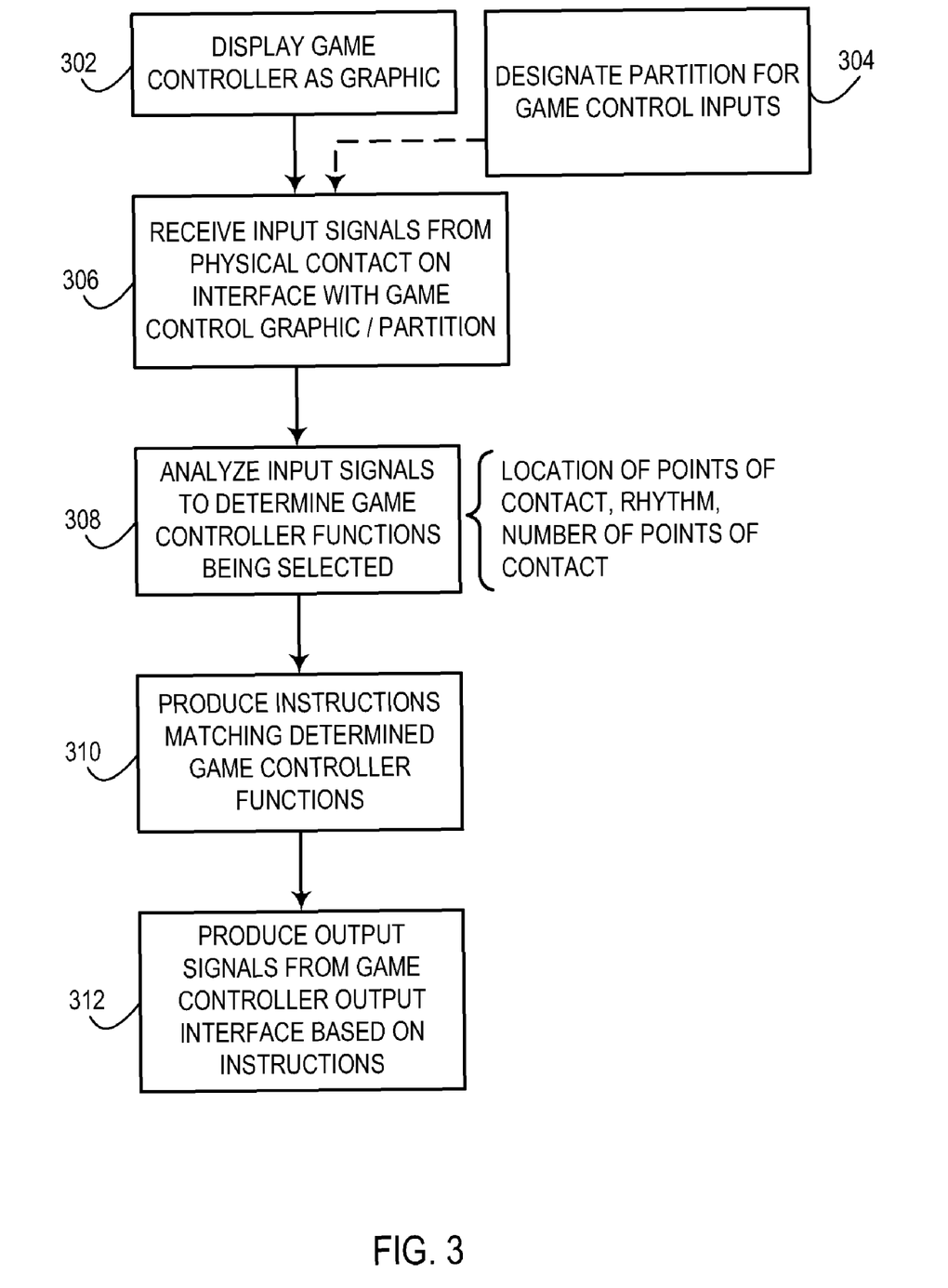
FIG. 3 shows one example of a set of logical operations being performed by a multi-touch interface according to various embodiments to provide a game controller function in association with a game console.

FIG. 3 shows one example of a set of logical operations that may be performed by the processor 108 to provide a game controller feature via the multi-touch interface 102. The processor 108 may provide the game controller feature in various ways. In one example, the processor 108 displays a game controller with a particular configuration of game control input selections such as buttons and control pads as in a display operation 302. In another example, the processor 108 receives patterns of physical contact such as within a dedicated partition, such as the partition 120, 124, of the display to represent game control inputs rather than receiving selection of a displayed game controller selection as in a designation operation 304. In yet another example, the processor 108 may display a game controller and receive selections from the displayed game controller as well as receiving patterns of physical contact unrelated to the displayed game controller to represent additional game control inputs.

The processor 108 begins receiving input signals containing data that represents the physical contact on the multi-touch interface 102 at a reception operation 306. The physical contact being represented may be in conjunction with displayed game controller selections where the physical contact takes place at the area of the multi-touch interface 102 where the game controller selections are displayed. The physical contact being represented may be patterns in conjunction with a designated partition, such as the partition 120, 124, of the multi-touch interface 102.

The processor 108 analyzes the data of these input signals to determine the particular game controller functions that are being selected by the user at an analyze operation 308. The location of the points of contact map to the displayed selections of the game controller. Rhythms, pressure, and the number of points of contact relate to patterns of physical contact that may represent game controller functions.

The processor 108 produces instructions that match the determined game controller functions at an instruction operation 310. The output port of the connected game console 128 converts these instructions to output signals recognizable by the connected game console 128 at an output operation 312. The game console 128 then implements these instructions as if a conventional game controller was being used.

Figure 4:
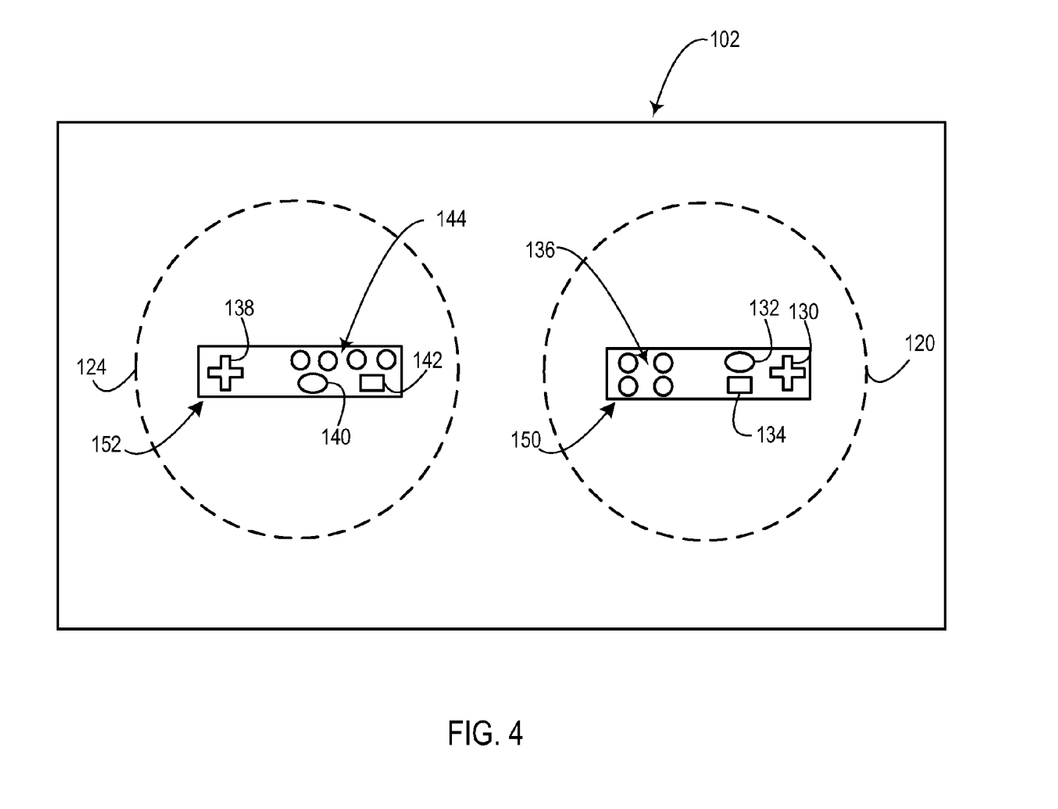
FIG. 4 shows an example of a display screen of the multi-touch interface according to various embodiments acting as a game controller.

FIG. 4 shows an example of the multi-touch interface 102 displaying two game controllers 150, 152, each within a corresponding partition, such as the partition 120, 124. The first controller 150 of this example has a first configuration as defined for the user who has been authenticated within the first partition 120. A control pad 130 is displayed on the right side, a control stick 132 is displayed at top-center, an administrative button 134 is displayed at bottom-center, and a set of game buttons 136 are displayed in a square pattern on the left. The second controller 152 of this example has a second configuration as defined for the user who has been authenticated within the second partition 124. A control pad 138 is displayed on the left side, a control stick 140 is displayed at bottom-center, an administrative button 142 is displayed at bottom-right, and a set of game buttons 144 are displayed linearly along the top.

Thus, it can be seen that two players may simultaneously interact with the corresponding game controllers 150, 152 being displayed on the same multi-touch interface 102. It can further be seen that the game controllers 150, 152 may be customized to each user, may be displayed within a partition, such as the partition 120, 124, for each user, and may be displayed as a result of the user being authenticated.

The game controller 150, 152 being displayed may have pressure sensitive controls where the multi-touch interface 102 has pressure detection. Furthermore, the game controller 150, 152 being displayed may have proportional controls, controls based on the combinations and/or sequences of buttons, and so forth. Thus, the game controller 150, 152 being displayed may provide similar if not the same controllability as would be provided by a game controller that has pressure sensitive buttons, proportional control sticks, and so forth.

Figure 5:
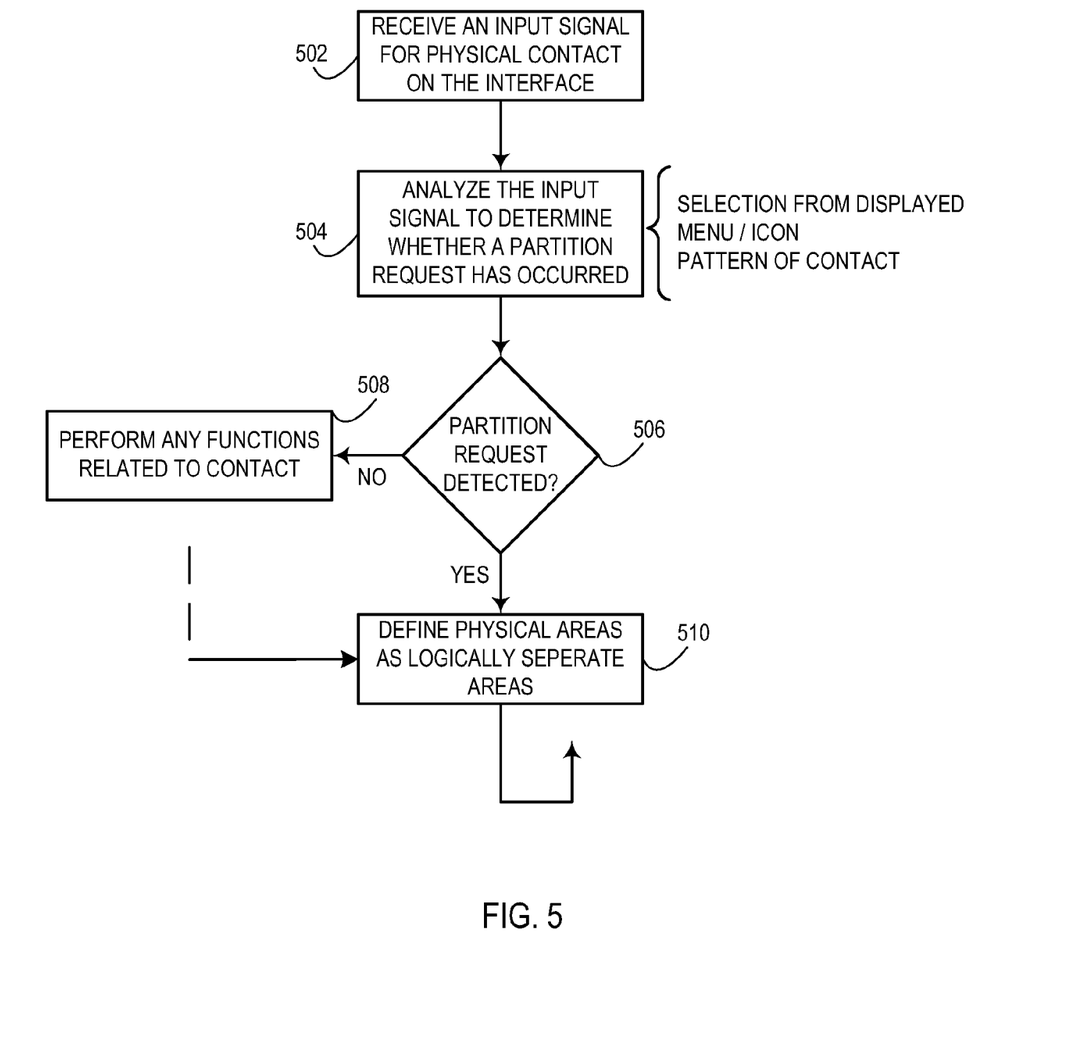
FIG. 5 shows an example of logical operations being performed by a multi-touch interface according to various embodiments to provide partitioning of the interface.

FIG. 5 shows one example of a set of logical operations being performed by the processor 108 to establish one or more partitions, such as the partitions 120, 124, on the multi-touch interface 102. The logical operations begin by the processor 108 receiving an input signal that includes data representative of physical contact on the interface 102 at a reception operation 502. The processor 108 then analyzes the data of the input signals to determine whether a partition request has occurred at an analyze operation 504. Here, the processor 108 may be looking for a location of the physical contact that matches a displayed menu option or icon to activate partitioning. As an alternative, the processor 108 may be looking for a pattern of physical contact that represents a request to partition.

At a query operation 506, the processor 108 determines whether a partition request has been received based on the analysis. If not, then the processor 108 proceeds in performing any functions related to the contact, such as selection of a displayed object or menu item, resizing or movement of objects, and so forth at a function operation 508. If a match is found, then the processor 108 creates a partition, such as the partition 120, 124, by defining a physical area on the multi-touch interface 102 as a separate logical area at a partition operation 510. Here, the processor 108 may draw a boundary line, such as the dashed lines shown in FIGS. 1 and 4 to visually indicate the location of the partition 120, 124. The processor 108 may associate the partition 120, 124 with a user by associating the defined space with a user profile to customize the partition in accordance with the profile The partition request of this embodiment may be an anonymous request (i.e., not from an authenticated user), may be a request of a previously authenticated user, or may be a request that serves to both request the partition 120, 124 and authenticate the user. For instances where the request is an anonymous request, then according to various embodiments and as discussed below in relation to FIG. 6, a user may subsequently attempt to be authenticated to the partition 120, 124 to effectively take possession of that partition of the multi-touch interface 102.

A second option is shown in FIG. 5 where the processor 108 begins by defining the partition 120, 124 at the partition operation 510 as an automatic function rather than in response to a user request. For example, the processor 108 may be configured to define one or more partitions upon start-up. The partition(s) 120, 124 that is established may already be dedicated to a particular user, or as discussed below in relation to FIG. 6, a user may be authenticated to a particular partition after the partition has been established.

Figure 6:
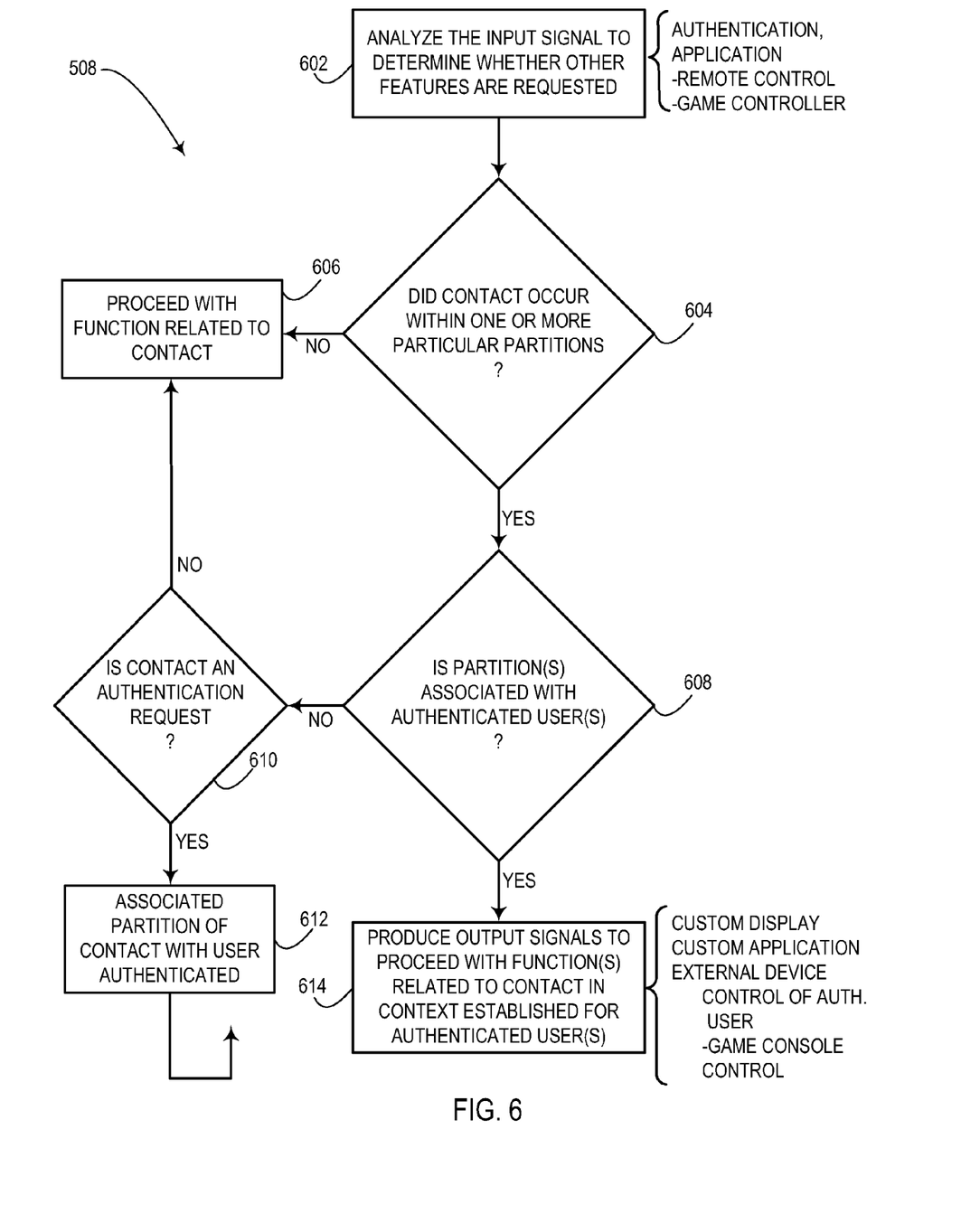
FIG. 6 shows an example of logical operations being performed by a multi-touch interface according to various embodiments to receive and act on physical contact as input after partitioning the interface.

FIG. 6 shows one example of a set of logical operations corresponding to the function operation 508 of FIG. 5. These logical operations begin by the processor 108 analyzing the data of the input signal to determine whether other features besides a partition request have been received at an analysis operation 602. Examples of such features include a request for authentication, a request for a particular application to be invoked, such as a remote control or game controller application, and so forth. The processor 108 then detects at a query operation 604 whether the physical contact occurred within one or more partitions, such as the partitions 120, 124, that have been established. If the contact was not within the established partition 120, 124, then the processor 108 proceeds in performing any functions not specific to the particular partition that are related to the contact, such as selection of a displayed object or menu item, resizing or movement of objects, and so forth at a function operation 606.

Where the processor 108 finds that the contact did occur within the bounds of the partition 120, 124 that has been defined, then the processor 108 detects whether the partition is already associated with a particular user, such as one who has been authenticated to the partition or one who is automatically assigned to the partition at a query operation 608. If the partition 120, 124 where the contact has occurred is not associated with a user, then the processor 608 detects whether the contact is an authentication request for the partition at a query operation 610. This detection may proceed according to the logical operations discussed above in relation to FIG. 2 regarding a user attempting to be authenticated. If the contact is not a partition request, then operational flow proceeds to the function operation 606. If the contact is a partition request, then the processor 108 associates the partition with the authenticated user at association operation 612.

Returning to the query operation 608, where the processor 108 finds that the partition 120, 124 is already associated with an authenticated user, then the processor 108 produces output signals to proceed with functions related to the contact at an output operation 614. However, these output signals are produced in recognition of the context that is established for the authenticated user and with respect to the partition 120, 124 in which the contact has occurred. Thus, within this partition 120, 124, a custom display may result that provides custom responses to physical contact, custom applications may be offered to the user within the partition, options to control external devices associated with the authenticated user may be offered within the partition, and so forth.

Figure 7:
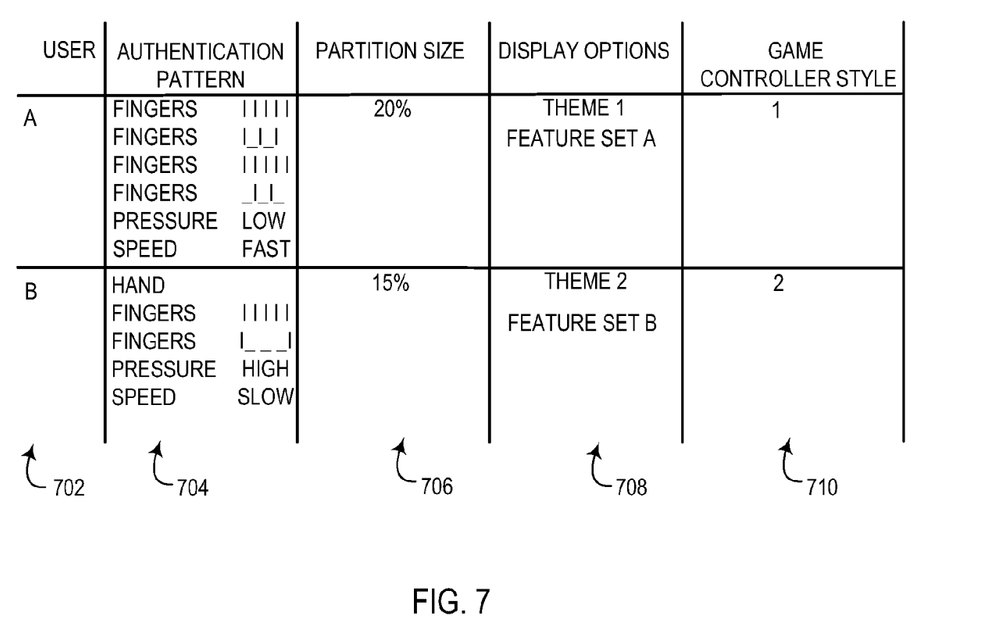
FIG. 7 shows an example of user profile associations being implemented by a multi-touch interface according to various embodiments.

FIG. 7 shows one example of a database within the storage device 112 that contains the user profiles for the multi-touch interface 102. The user profiles may maintain the various associations between the identity of the user, the authentication pattern of the user, various interface options to apply on behalf of the user, and other such user specific associations. In this example shown, the database includes a first column 702 that includes the identity of each user who is eligible for authentication or for other user-specific features of the multi-touch interface 102.

Other columns are present within the database to provide guidance to the processor 108 regarding the user specific criteria. In a second column 704, the database includes the authentication patterns of each user. The authentication patterns may be specified in terms of which part of the hand or hands of a user is making contact at which point in a sequence of the pattern, how much pressure should be applied, and the speed at which the sequence should proceed. For example, user A has a pattern that begins with all five fingertips of a hand making contact, then the first, third, and fifth fingertips only, then all five fingertips, and then the second and fourth fingertips only. User A is to follow this sequence with low pressure being applied but with a fast pace from one step of the sequence to the next.

As one specific example of authentication patterns, the sequence may correspond to musical notes, such as those being played on a piano keyboard. Thus, the user may place one or both hands near the multi-touch interface 102 and proceed to move his or her fingers as if playing a song on a piano. The notes, the tempo, the fortissimo, the crescendo, and any other relevant musical criteria may form the authentication pattern that must be matched in order to successfully be authenticated.

A third column 706 of this example provides a set partition size for this user. Thus, when the user is authenticated and requests a partition, such as the partition 120, 124, this particular size partition will be defined. The partition size may be specified as a percentage of the overall space of the multi-touch interface 102, as a specific set of coordinates, and so on. The partition 120, 124 may be defined based on the center of the points of contact being the center of the partition, based on a specific location as defined in the user profile, or by some similar manner. As an alternative, upon requesting a partition, the processor 108 may generate a message on the display to prompt the user to draw the desired bounds of the partition 120, 124 that has been requested.

A fourth column 708 of this example provides a set of display options for this user. Thus, when this user is authenticated, these display options may be applied to the space on the multi-touch interface 102 being used by this user. In one instance, these display options may be applied to the entire multi-touch interface 102, such as where no partitions are present and no other user with display options has been authenticated. In another instance, these display options are limited to a set portion of the multi-touch interface 102, such as the partition 120, 124 within which the user has been authenticated. The display options may include themes with color schemes, icon styles, menu styles, and the like. The display options may further include feature sets such as tasks to be performed based on particular patterns of physical contact, the available applications, and so on.

A fifth column 710 of this example provides a game controller style for the user. As discussed above in relation to FIG. 4, the style of game controller, such as the game controller 150, 152, may vary from one user to the next. Thus, upon a user being authenticated, when the user subsequently requests that a game controller application be provided, the game controller 150, 152 that is provided to the user may be that which is specified in the user profile.

Embodiments as discussed above provide users with increased usability of the multi-touch interface 102. Features such as authentication, partitioning, and external device control give users additional features that may increase the enjoyment and productivity available from the multi-touch interfaces 102.

While embodiments have been particularly shown and described, it will be understood by those skilled in the art that various other changes in the form and details may be made therein without departing from the spirit and scope of the invention.

What is claimed is:

1. A computer readable medium containing instructions for performing acts in conjunction with a multi-touch interface, the acts comprising:
   receiving input signals in response to multiple points of simultaneous physical contact on the multi-touch interface;
   comparing the input signals to data this is stored in a memory and that represents a pattern of physical contact associated with a user;
   determining from the comparison whether the physical contact represented by the input signals matches the pattern of physical contact associated with the user; and
   producing a signal value that indicates a successful authentication of the user and that identifies the user upon determining that the physical contact matches the pattern of the physical contact associated with the user.

2. The computer readable medium of claim 1, wherein the memory stores data representing a unique pattern of physical contact for a plurality of users and wherein the acts comprise producing signal values for each user that are authenticated by the pattern of physical contact.

3. The computer readable medium of claim 2, wherein the acts further comprise partitioning the multi-touch interface into a separate area for each user who is successfully authenticated.

4. The computer readable medium of claim 1, wherein the pattern of contact comprises a number and location of the points of contact.

5. The computer readable medium of claim 4, wherein the pattern of contact further comprises a rhythm from at least one of the points of contact, wherein the acts further comprise supplemental physiological sensing and considering information from the supplemental physiological sensing in addition to the pattern of physical contact.

6. The computer readable medium of claim 1, wherein the acts further comprise generating a display that is unique to the user identified by the signal.

7. The computer readable medium of claim 6, wherein generating the display comprises generating a display of a game controller, and wherein the acts further comprise generating control signals based on interaction with the game controller and outputting the control signals to a game console as control signals.

8. A device for generating external control signals, comprising:
   a multi-touch interface that produces input signals in response to multiple points of simultaneous physical contact;
   a processing device in data communication with the multi-touch interface, that analyzes the input signals to produce instructions to manipulate an aspect of an electronic game; and
   an output interface for sending game control signals to a gaming console, the output interface receiving the instructions from the processing device and generating the game control signals based on the instructions.

9. The device of claim 8, further comprising memory storing data representing a pattern of physical contact in association with a user, wherein the processing device receives the input signals in response to the physical contact and compares at least a portion of the input signals to the stored data representing the pattern of physical contact to determine if the physical contact represented by the input signals matches the pattern of physical contact associated with the user, and that produces a signal value that indicates successful authentication of the user and that identifies the user upon determining that the physical contact represented by the pattern of physical contact matches the pattern of physical contact associated with the user.

10. The device of claim 9, wherein the processing device displays graphical controls on the multi-touch interface and wherein the processing device accesses information from memory specifying at least one characteristic of the displayed graphical controls that is associated with the user that has been successfully authenticated, and wherein physical contact by a user with the graphical controls causes the multi-touch interface to produce the input signals.

11. The device of claim 9, wherein the electronic game has a plurality of players, wherein the processing device defines an area of the multi-touch display that is dedicated for the identified user and wherein the processing device produces instructions in response to input signals stemming from physical contact within the defined area that specify manipulations of aspects of the electronic game associated with a particular player of the plurality.

12. The device of claim 8, wherein the processing device displays graphical controls on the multi-touch interface and wherein physical contact by a user with the graphical controls causes the multi-touch interface to produce the input signals.

13. A method of providing defined areas of interaction with a multi-touch display, comprising:
   defining physical areas of the multi-touch display as logically separate areas without regard to content being displayed on the multi-touch display;
   receiving multiple points of simultaneous physical contact on the multi-touch display;

determining which of the multiple points of simultaneous physical contact occur within each of the logically separate areas; and produce at least one signal based on which of the multiple points of contact occur within each of the logically separate areas.

14. The method of claim 13, wherein a first signal corresponds to multiple points of physical contact within a first area of the multi-touch display and wherein a second signal different that the first signal corresponds to multiple points of physical contact within a second area of the multi-touch display.

15. The method of claim 14, wherein the first area of the multi-touch display corresponds to a control of a first external device and wherein the second area of the multi-touch display correspond to a control of a second external device.

16. The method of claim 13, further comprising receiving a first set of multiple points of physical contact on the multi-touch display and wherein defining the physical areas comprises basing a first of the physical areas on where the first set of multiple points of physical contact occurs on the multi-touch display.

17. The method of claim 16, further comprising:

detecting from the first set of multiple points of contact whether a pattern is present that matches a pattern stored in association with the identification of a first user; and upon detecting that the pattern is present that matches the pattern stored in association with the first user, applying subsequent physical contact occurring within the first area as input to applications of the multi-touch interface that are associated with the first user.

18. The method of claim 16, wherein a first application of the multi-touch interface that is associated with the user is control information for an external game console.

19. The method of claim 18, further comprising displaying a game controller within the first area, and wherein the subsequent physical contact occurring within the first area is interaction with the game controller.

20. The method of claim 19, wherein displaying the game controller comprises displaying a game controller that is customized for the first user according to game controller customization data stored in association with the identification of the first user.

* * * * *